R. CROMPTON.
WEFT REPLENISHING COLOR LOOM.
APPLICATION FILED JAN. 30, 1915.

1,142,938.

Patented June 15, 1915.
9 SHEETS—SHEET 1.

Witnesses:
Carl L. Choate
Edward W. Baker

Inventor:
Randolph Crompton,
by Emery, Booth, Janney and Varney,
Attys

R. CROMPTON.
WEFT REPLENISHING COLOR LOOM.
APPLICATION FILED JAN. 30, 1915.

1,142,938.

Patented June 15, 1915.

R. CROMPTON.
WEFT REPLENISHING COLOR LOOM.
APPLICATION FILED JAN. 30, 1915.

1,142,938.

Patented June 15, 1915.
9 SHEETS—SHEET 4.

Witnesses:
Carl L. Choate
Edward W. Baker

Inventor:
Randolph Crompton,
by Emery, Booth, Janney and Varney
Attys.

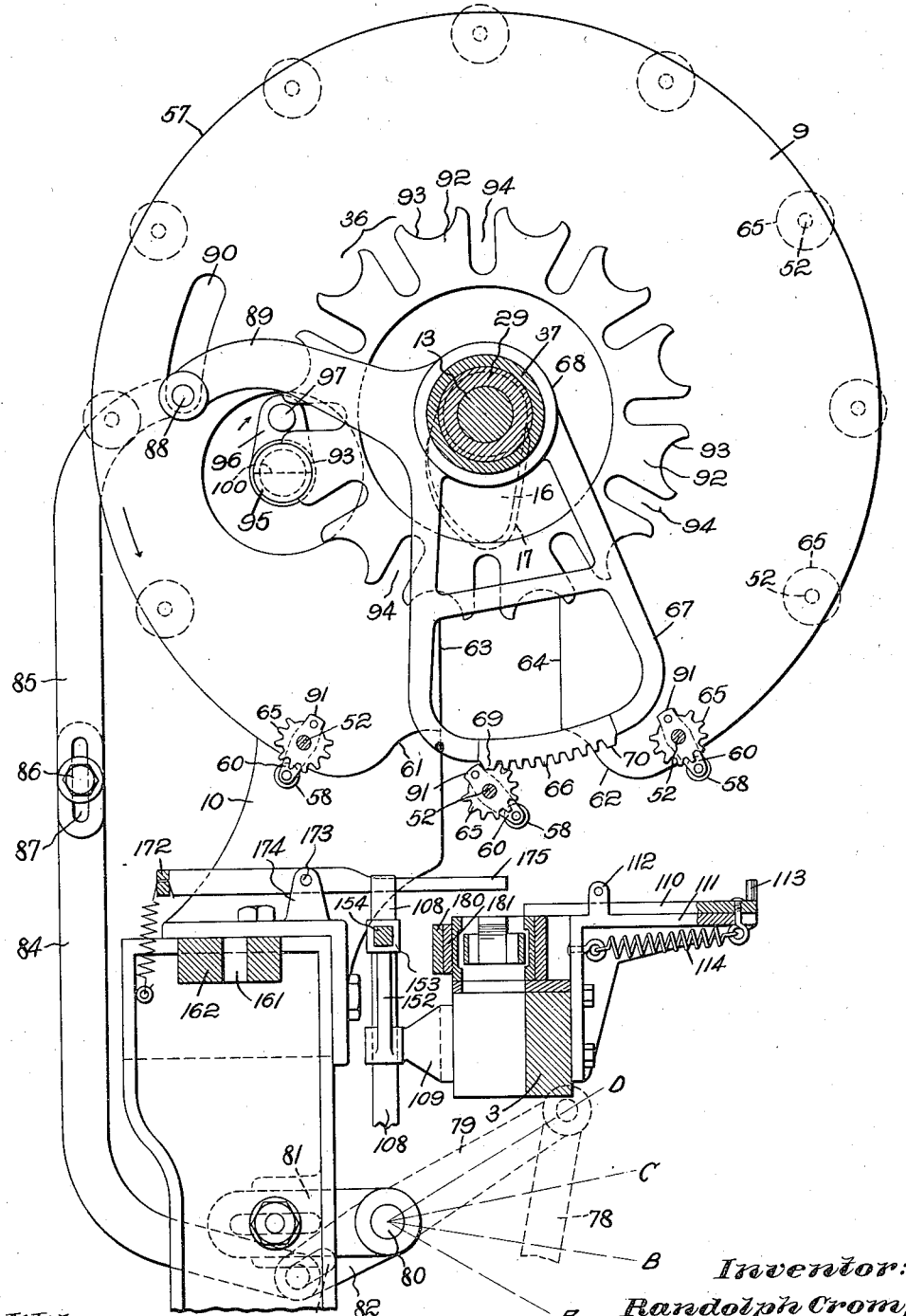

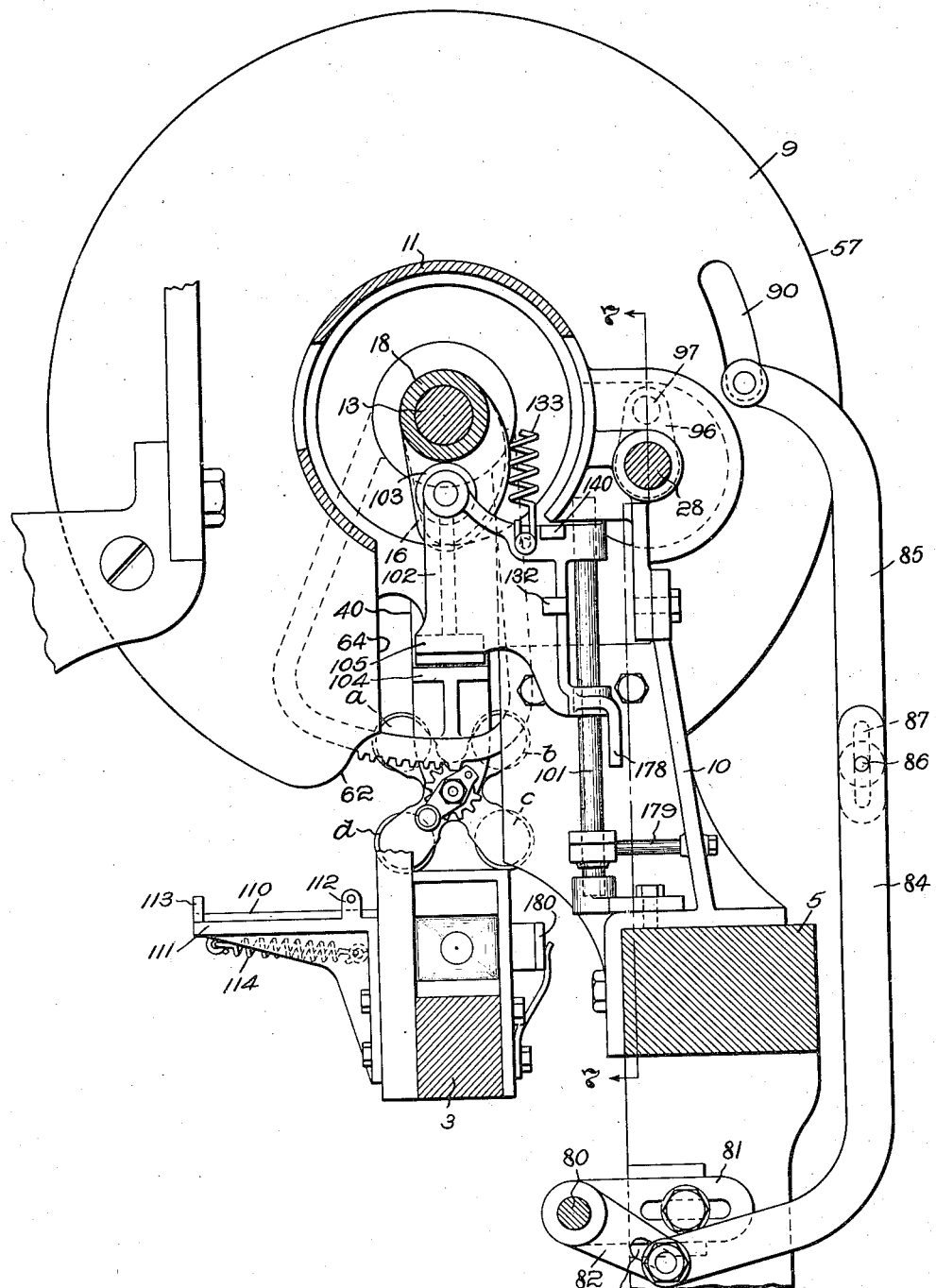

R. CROMPTON.
WEFT REPLENISHING COLOR LOOM.
APPLICATION FILED JAN. 30, 1915.
1,142,938.
Patented June 15, 1915.
9 SHEETS—SHEET 7.
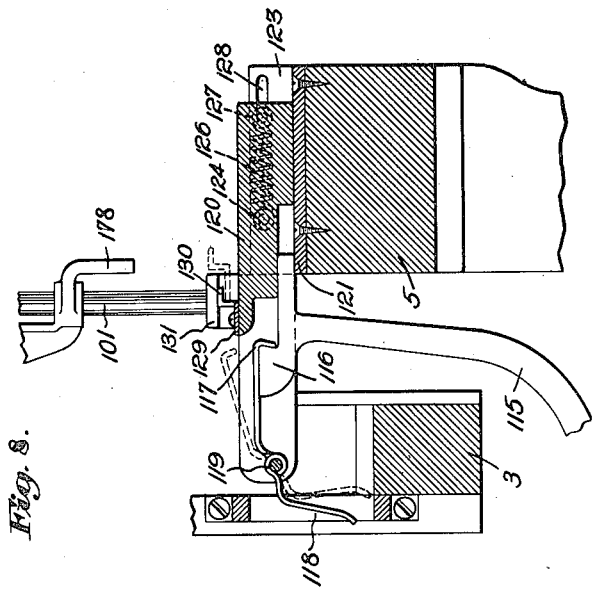
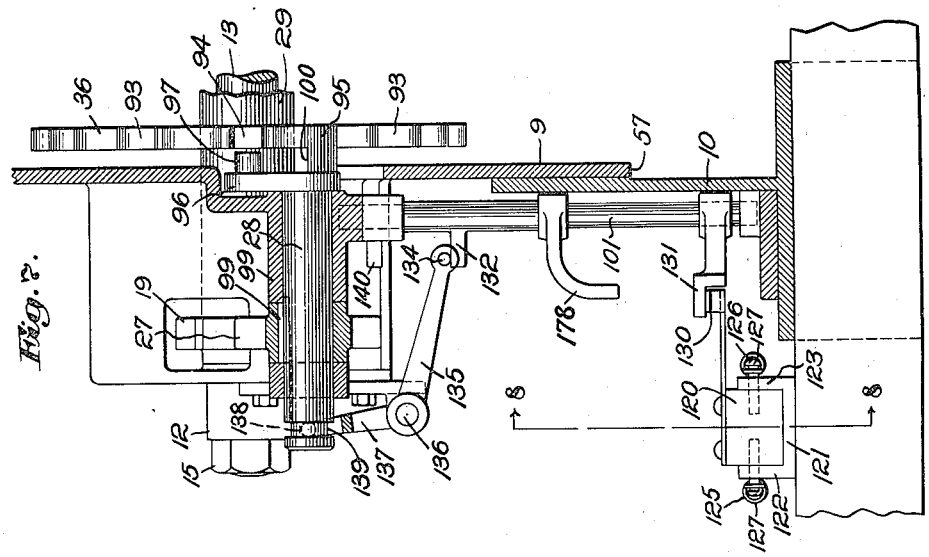
Witnesses:
Carl L. Choate
Edward W. Baker.
Inventor:
Randolph Crompton,
by Emery, Booth, Janney and Varney,
Attys.

Figure 3:
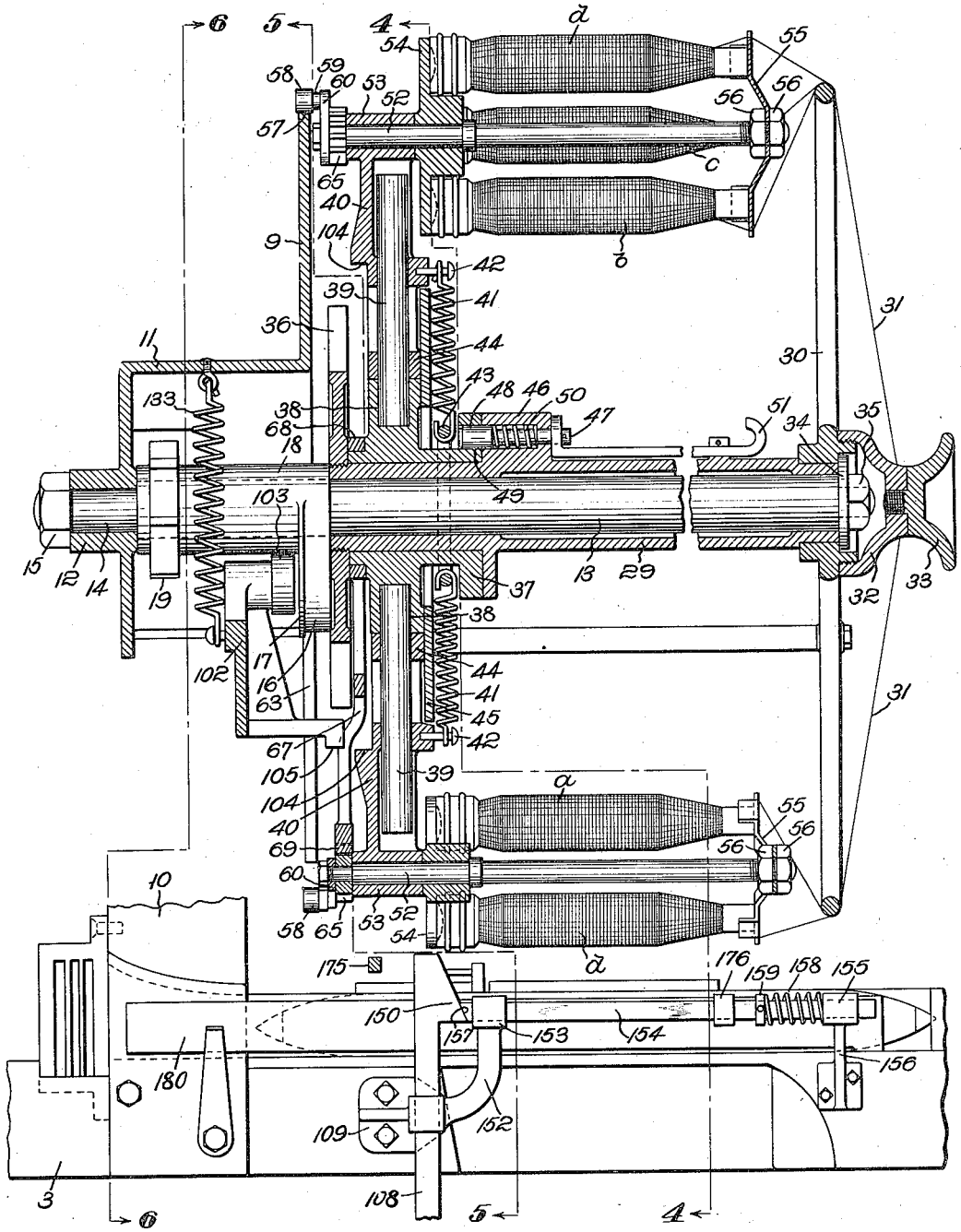

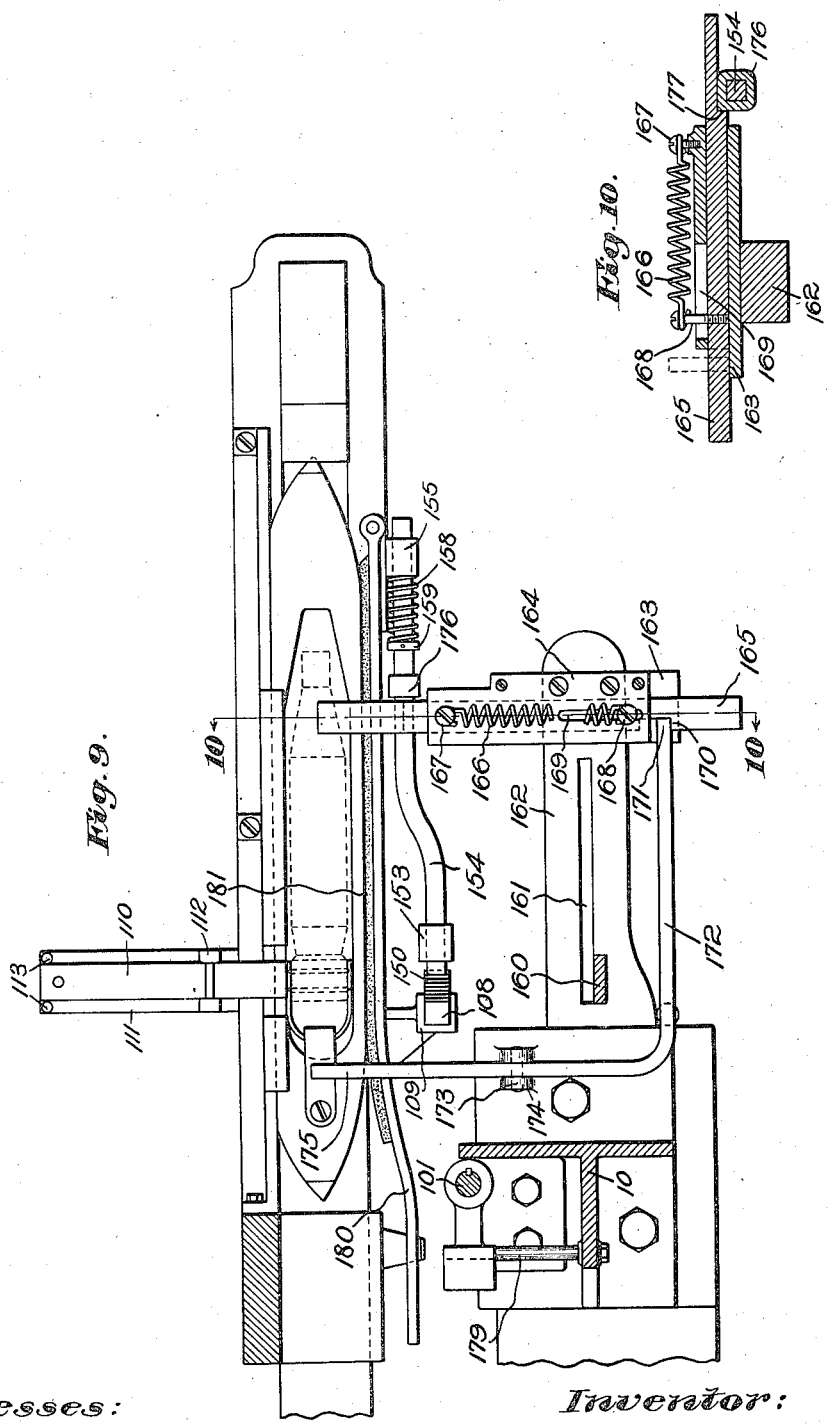

sidiary magazine castings is held from rotation upon its arm or spoke 39. In the normal operation of the loom, the hub 37 is locked to the shaft 29 and might be formed rigid therewith were it not that preferably I provide means whereby the series of subsidiary magazines may be turned by hand for reloading. I therefore preferably provide means whereby said hub 37 and the sleeve 29 may be locked or secured together in a manner permitting disconnection for reloading and for any other desired purpose. To this end, I have in Fig. 3, represented the sleeve 29 as having an enlarged portion 46 recessed for the reception of a sliding bolt 47, the head 48 of which penetrates a hole 49 in a flange of the hub 37. A spring 50 surrounding the bolt 47 normally maintains the sleeve 29 and hub 37 in locked position. A sliding handle 51 connected to the bolt 47 and suitably guided, permits the withdrawal of the bolt and the independent rotation of the hub 37 with its arms or spokes and their series of subsidiary magazines.

As indicated most clearly in Figs. 3, 4, 12 and 13, I have represented each subsidiary magazine casting or body portion 40 as having a horizontal shaft 52 mounted for rotation in a sleeve portion 53 of the casting 40. Fast upon the inner portion of said shaft 52 is a member 54 constituting a support for the bases of a series of bobbins or other suitable weft carriers which I have herein indicated as $a$, $b$, $c$ and $d$, and which correspond in color or other distinguishing characteristic with the filling in the several shuttles A, B, C and D. I have stated that any suitable number of shuttles may be employed, a number greater than four being used if desired. Similarly I may employ any suitable number of bobbins or weft carriers in each subsidiary magazine, the number corresponding to the number of shuttles in the loom. The bases of the bobbins are supported by said member 54, which in the embodiment of the invention shown is in the form of a cross. The tip ends of the bobbins are suitably supported in a correspondingly shaped spring member 55 preferably formed of sheet metal, so as to support the bobbins with suitable spring pressure and shaped as indicated frictionally to support the tips of the bobbins. Said member 55 is supported upon the outer threaded end of the shaft 52 by suitable nuts 56.

Figure 4:
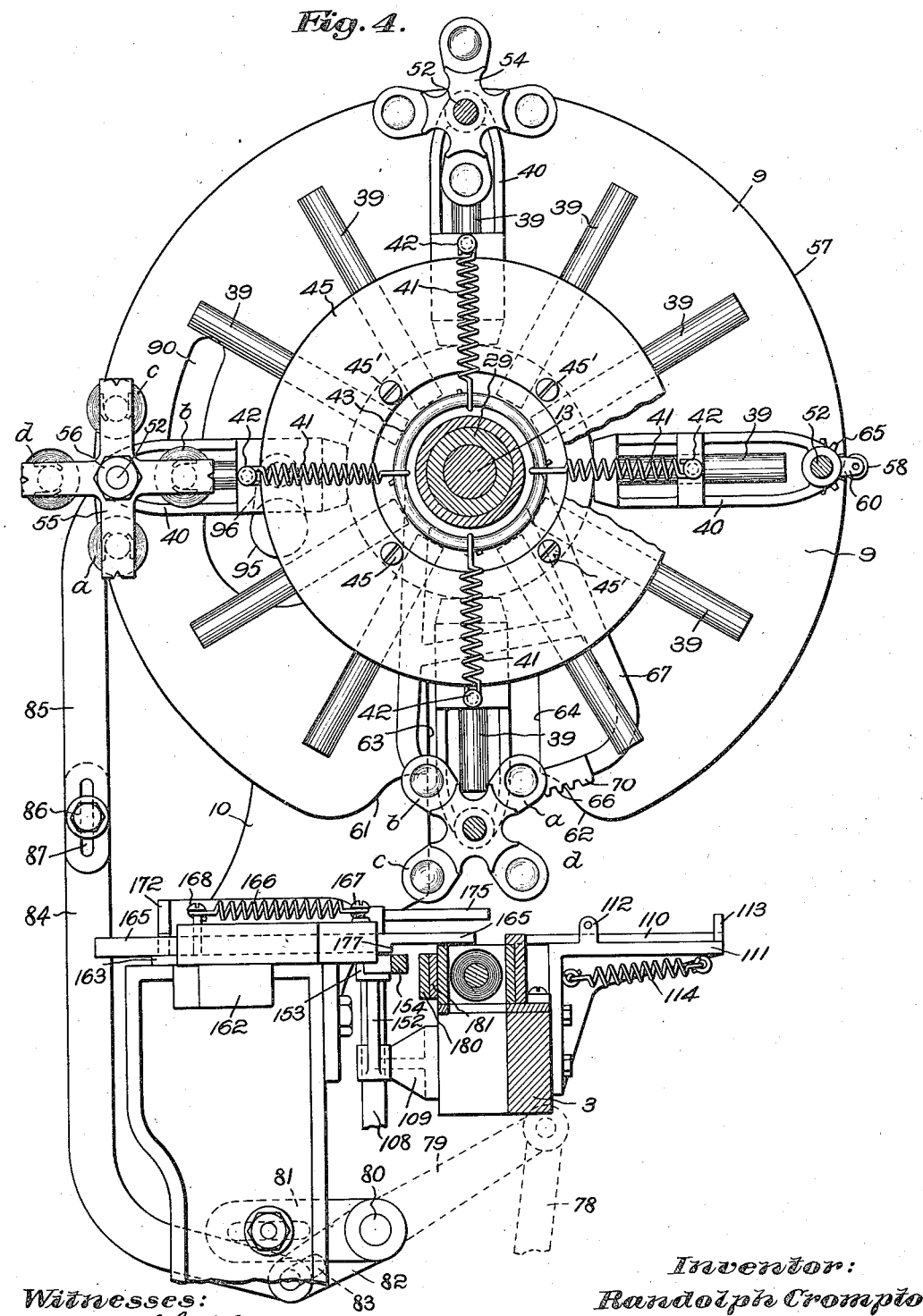

The disk 9 as represented most clearly in Figs. 3, 4 and 5, is provided with a rim 57 upon which rides a series of rolls 58 each mounted upon a projection 59 of a crank arm 60 fast upon and extending from the shaft 52 of one of the subsidiary magazines. The said rim 57 is generally circular in outline but at the lower portion of the master magazine it is provided with inwardly curved portions 61, 62, of suitable contour and with vertically spaced, substantially straight walls 63, 64 providing an opening therebetween permitting the replenishing operation. Each of the shafts 52 has also fast thereon a pinion 65 adapted to mesh at the proper time with a slightly curved rack 66 upon a swinging segment 67 herein shown as of skeleton formation and provided with a hub 68 whereby it is loosely mounted upon the hub 37 as indicated in Fig. 3, and preferably adjacent to the star wheel 36. The said rack 66 is provided at its opposite ends with enlarged teeth 69, 70.

Figure 1:
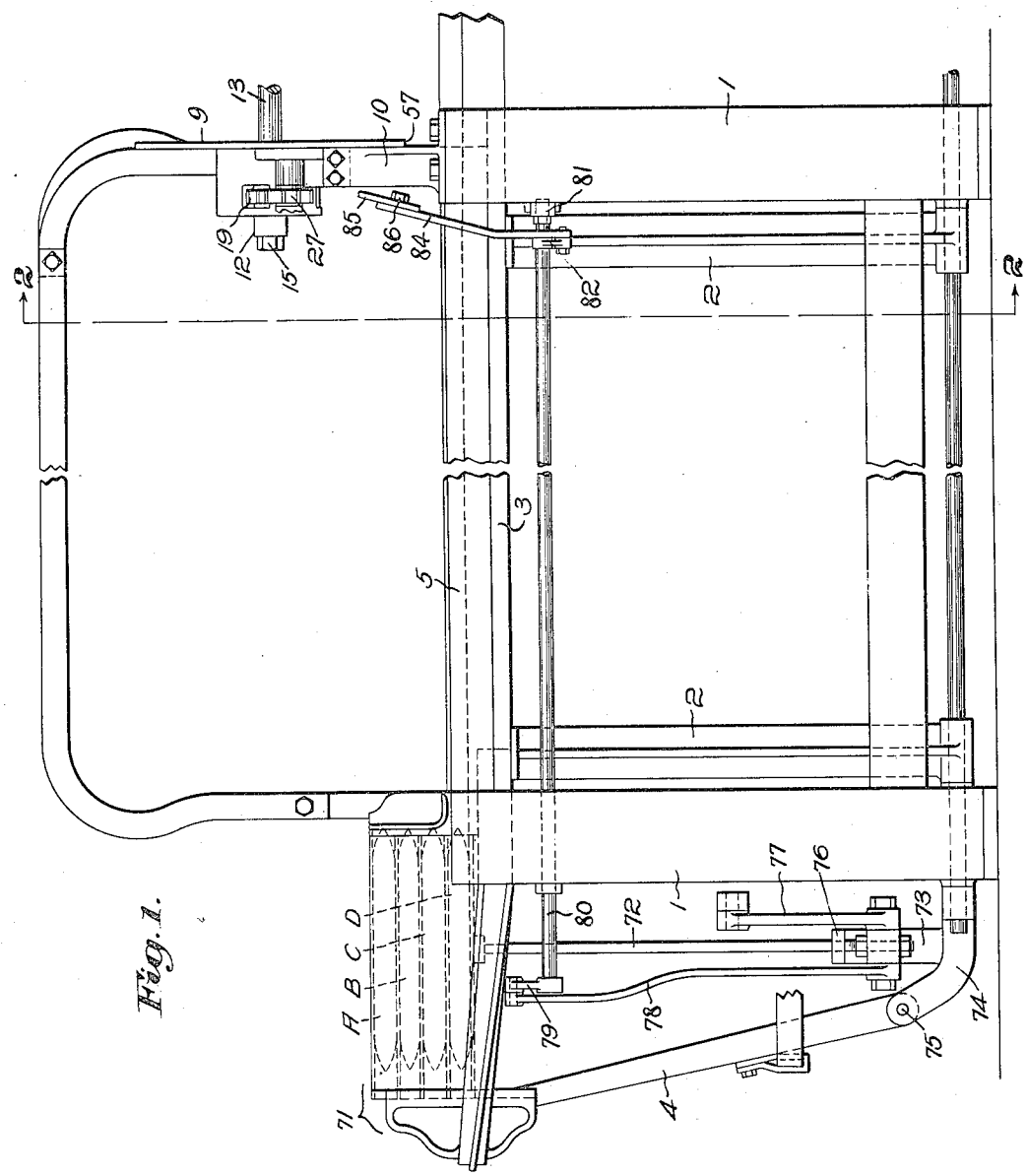

Inasmuch as the shuttles of the loom carry bobbins or weft carriers contrasting among themselves in color or otherwise, it is necessary that, in the disclosed embodiment of the invention, I provide means whereby the movements of the bobbins or weft carriers of the active, subsidiary magazine may synchronize with or correspond to the movements of the shifting shuttle boxes so that when replenishment is indicated, it may be effected by placing in the running shuttle a bobbin or weft carrier corresponding in color or other characteristic to the weft in the running shuttle. To that end, in this embodiment of the invention, I preferably employ the following means: In Fig. 1, I have represented the series of shifting shuttle boxes at 71 and as supported by a suitable shifting shuttle box rod 72, which is mounted for sliding movement upon an upright bracket 73, itself mounted upon or extending from the rocking arm 74 whereon the picker stick 4 is pivoted at 75. The brackets 73 is provided with a guide 76 for the shifting shuttle box rod 72 and the latter has imparted thereto rising and falling movements as called for by the pattern mechanism by means of a suitable link or connecting rod 77 operated in any usual manner not herein necessary more fully to describe. Connected at its lower end in any suitable manner to the said shifting shuttle box rod 72 is a connecting rod 78, the upper end whereof is pivotally connected to a crank 79 fast upon a rock shaft 80 suitably mounted in bearings in the loom frame and extending longitudinally of the loom as indicated most clearly in Fig. 1. Said bearings may be adjustably supported in brackets, one of which is indicated at 81 in Fig. 5. At or near its opposite end the said rock shaft 80, as shown most clearly in Fig. 5, is provided with a crank arm 82 preferably slotted as indicated at 83 and having pivoted therein the lower end of an operating link herein shown as composed of two parts, 84, 85 adjustably connected by a bolt 86 adapted to be suitably positioned in a slot 87 in one of said parts. At its upper end the part 85 of the link is pivotally connected at 88 to an arm 89 extending from the seg-

UNITED STATES PATENT OFFICE.

RANDOLPH CROMPTON, OF CHATHAM, MASSACHUSETTS.

WEFT-REPLENISHING COLOR-LOOM.

1,142,938.  Specification of Letters Patent.  Patented June 15, 1915.

Application filed January 30, 1915. Serial No. 5,187.

*To all whom it may concern:*

Be it known that I, RANDOLPH CROMPTON, a citizen of the United States, and a resident of Chatham, in the county of Barnstable and State of Massachusetts, have invented an Improvement in Weft - Replenishing Color-Looms, of which the following description, in connection with the accompanying drawings, is a specification, like characters on the drawings representing like parts.

This invention relates to weft replenishing color looms.

In order that the principle of the invention may be readily understood, I have disclosed a single embodiment thereof in the accompanying drawings, wherein—

Figure 2:
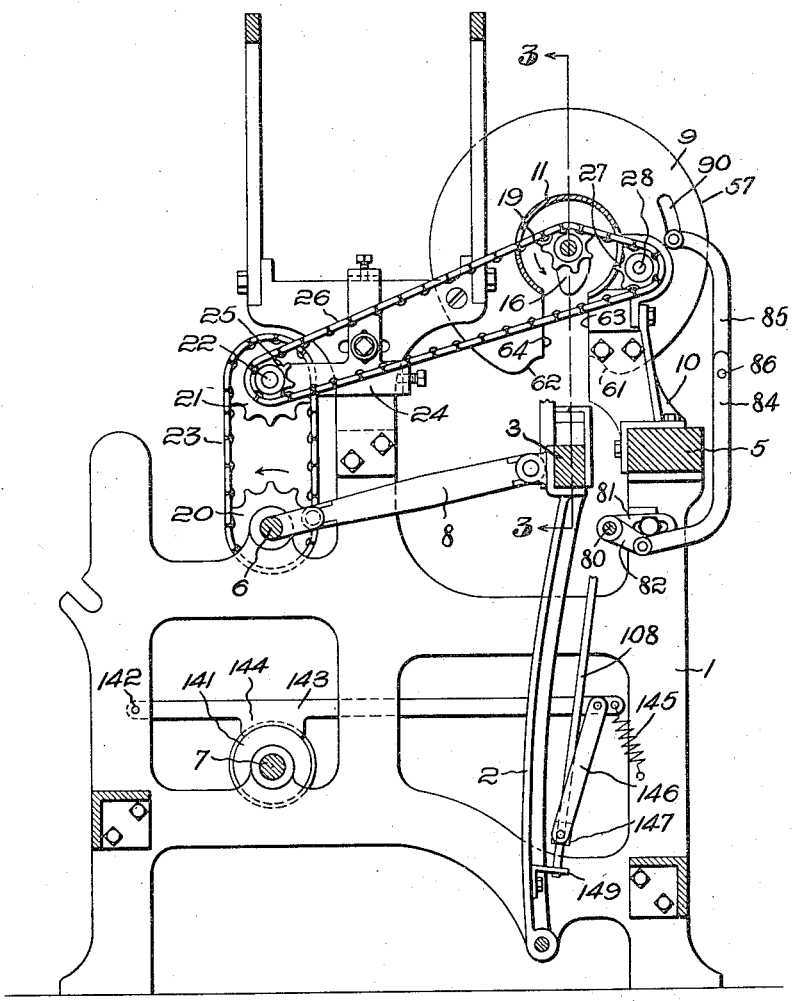

Figure 1 is a front elevation of a loom embodying my invention, parts being broken away; Fig. 2 is a vertical transverse section upon the line 2—2 of Fig. 1 and looking toward the right hand end of the loom; Fig. 3 is a vertical, longitudinal section on an enlarged scale upon the line 3—3 of Fig. 2, and showing the master magazine and certain of the subsidiary magazines; Figs. 4, 5 and 6 are vertical transverse sections upon the lines 4—4, 5—5 and 6—6 respectively of Fig. 3, and looking in the direction of the arrows indicated thereon; Fig. 7 is a vertical section upon the line 7—7 of Fig. 6; Fig. 8 is a vertical section upon the line 8—8 of Fig. 7; Fig. 9 is a plan view of the right hand shuttle box showing the running shuttle positioned therein, certain of the parts being in section; Fig. 10 is a transverse section upon the line 10—10 of Fig. 9; Fig. 11 is a vertical section taken through the active, subsidiary magazine and representing one of the bobbins thereof as positioned within the running shuttle; Figs. 12 and 13 are vertical sections taken through the shuttle box and representing successive positions of the active, subsidiary magazine in the positioning of the bobbin thereof in the running shuttle; and Fig. 14 is a detail in side elevation and plan of a slight modification of one portion of my invention.

An important object of my invention is the supplying of fresh filling carriers to the active or running shuttle of a color loom when the filling carrier in the said shuttle has become substantially or wholly exhausted.

While my invention is in no sense confined thereto, it more particularly relates to that class of automatic looms wherein a rotary magazine or hopper is employed.

This invention is in certain aspects thereof an improvement upon the invention disclosed in my co-pending application Serial No. 189, filed January 2, 1915.

As set forth in said application, it has heretofore been proposed in automatic looms to strike the filling carrier in the magazine a sudden blow with a hammer or transferrer when the lay carrying the exhausted or substantially exhausted filling carrier stations itself in the course of weaving directly under the filling carrier in its changing position after the suitable indication has been made. It has also been proposed in automatic looms to lift the shuttle containing the exhausted or substantially exhausted carrier above the line of the race way of the lay into an abnormal or changing position. In the latter case the exhausted carrier is upwardly pressed by the carrier in the changing position in the magazine and is displaced by the latter. The shuttle is then returned to the level of the race way of the loom. It has still further been proposed to run the shuttle on its side and to knock the bobbin or filling carrier into the shuttle by a hammer or transferrer and to hold the bobbin by the tips in a stationary position when the latter is placed in its changing position and to allow the forward motion of the lay to cause the shuttle to cover or receive the fresh filling carrier, and thereby to substitute the latter for the exhausted bobbin.

In the present invention, and making reference to the disclosed, single embodiment thereof, I dispense with the hammer or transferrer and move, and herein depress, a subsidiary magazine, which is one of a series of magazines carried by the master magazine, each carrying a plurality of bobbins or suitable filling carriers, directly into the shuttle. Said filling carriers pertaining to a single, subsidiary magazine may be of different colors of filling or may be of fillings contrasting in any way. I thus substitute a fresh filling carrier for the exhausted or partly exhausted filling carrier contained in the shuttle, the substituted fresh filling carrier corresponding in color or otherwise to the filling in the running shuttle. By employing a plurality of subsidiary magazines each containing a plurality of bobbins or other suitable filling carriers contrasting in color or otherwise, I am enabled to utilize more bobbins or filling carriers in a rotary magazine under positive control than has heretofore been possible, so far as I am aware.

By the use of my invention, I avoid all rough handling of the filling carriers as the magazines in the preferred embodiment of the invention are moved directly into the shuttle, thus putting all the necessary strain incident to bobbin or filling-carrier transfer upon the mechanism itself rather than upon the bobbin or filling carrier.

Referring to that embodiment of the invention herein illustrated, the frame of the loom is indicated at 1 in the several figures, the swords of the lay are indicated at 2, and the shuttles, of which any desired number may be employed, and which carry filling differently colored or otherwise differentiated, are indicated at A, B, C and D. The lay of the loom is indicated at 3, the picker stick at the left hand end is indicated at 4, and the breast beam of the loom is indicated at 5. The driving or crank shaft is indicated at 6 and the cam shaft at 7, the latter being driven from the driving shaft in any suitable manner not herein necessary to disclose and preferably at one half the speed of the latter. The lay of the loom is driven from the crank shaft 7 by means of crank arms, one of which is indicated at 8, most clearly in Fig. 2. These parts may be of any suitable or ordinary construction.

Upon the framing and preferably at the right hand end of the loom viewed from the front thereof, I mount a substantially circular disk-like member 9 clearly shown in Figs. 2 to 5 inclusive, and constituting a portion of the master magazine. The said member 9 is supported upon the framing of the loom by means of a suitable foot or standard 10, most clearly shown in Fig. 2. The disk-like member 9, as most clearly shown in Fig. 3, is provided with a substantially central, recessed portion 11 having a sleeve-like, central extension 12 within which is fixedly secured a shaft 13. The said shaft is provided with a reduced inner end 14 fitting within said sleeve-like extension 12 and held therein against rotation by nut 15. Loose upon the shaft 13, as shown most clearly in Fig. 3, is a cam 16, also clearly shown in Figs. 2, 12 and 13. Said cam is provided with a guiding rib 17 to be hereinafter referred to and with a sleeve or barrel portion 18 mounted upon said shaft 13 and having rigid or integral therewith a sprocket pinion 19.

Upon the crank shaft 7 is mounted a sprocket gear 20 about which and an equal size sprocket pinion 21 upon a shaft 22 passes a sprocket chain 23 as shown most clearly in Fig. 2. The shaft 22 is supported in a suitable bracket 24. Fast upon said shaft 22 is a sprocket pinion 25 and passing thereabout and driven thereby is a sprocket chain 26 which passes over and drives the sprocket pinion 19, whereby the latter is driven in the direction of the arrow adjacent thereto in Fig. 2. The construction of the parts is such that the cam 16 is rotated once to each complete rotation of the crank shaft 7. Said sprocket chain 26 also passes about and drives a sprocket pinion 27 mounted upon a shaft 28 to be hereinafter referred to. The recessed portion 11 is suitably apertured as indicated in Figs. 2 and 6 for the passage of the sprocket chain 26. Also loose upon the shaft 13 is a suitable sleeve 29 and loose upon the outer end of said sleeve 29 is a thread supporting ring 30 by means of which the threads 31 extending from the various bobbins or weft carriers are supported, said thread ends being extended to and wrapped about a two-part cap member 32, 33, the basal part being threaded upon the hub of the thread ring 30 and the outer part 33 having a threaded nipple entering the part 32. By reason of this two-part construction the broken ends wrapped about said cap may be readily removed. The outer end of the sleeve 13 is provided with a washer 34 and nut 35 inclosed by the cap 32, 33.

Threaded upon and therefore fast with the sleeve 29 is a star wheel 36 positioned in proximity to the cam 16, and loose upon said sleeve 29, but adapted to be locked thereto, as will be hereinafter set forth, is the hub 37 whereon the subsidiary magazines are supported. The said hub 37 is provided with a series of radial sockets 38, herein represented as twelve in number, but which may be any desired number, and within which are mounted a corresponding number of arms or spokes 39 of any suitable construction but preferably circular in cross section, because of ease of manufacture. Upon each of said arms or spokes is mounted for sliding movement what I herein term a subsidiary magazine, shown as comprising or including a suitable casting 40 normally inwardly positioned by reason of a suitable coil spring 41, the outer end whereof is secured to a pin 42 upon the casting of the subsidiary magazine and the inner end whereof passes about a loose ring 43 which, because of the even tension of the series of springs 41, is held in substantially the position indicated in Figs. 3 and 4.

Each of the subsidiary magazine castings or members 40 is provided with a seat portion 44, shown most clearly in Fig. 3, having a flat outer face, also indicated in Fig. 11, which slides along the adjacent face of a disk 45 secured to the hub 37 by screws 45' shown in Fig. 4, whereby each of the subof said shaft with the recessed portion 93 of the tooth 92, which happens to be in proximity thereto. The shaft 28 is mounted for longitudinal sliding movement in the sleeve portion 99 of the disk 9 wherein it is mounted. To this end the sprocket wheel 27 is mounted upon said shaft with a feather, key, or spline 99' compelling conjoint rotation of said pinion or shaft but permitting sliding movement of the shaft with respect to the pinion. The head 95 of the shaft is cut away as indicated at 100 in Fig. 7, so that upon longitudinal movement of said shaft 28 the head 95 is removed from the socket 93 of the active tooth 92 of the star wheel, thus permitting the pin 97 upon said shaft 28 to rotate said star wheel the distance of one tooth, after which the said head 95 is brought into engagement with the recessed portion 93 of the next tooth 92, thus again locking the star wheel from rotation. The said shaft 28 may have axial movement imparted thereto in any suitable manner, and preferably by means to be hereinafter described.

Each of the subsidiary magazines is as previously described mounted for movement into the shuttle box and the shuttle therein at the proper time. In the disclosed embodiment of the invention, this movement is a substantially radial downward movement toward the shuttle box along the proper arm or spoke 39. In order at the proper time to impart such movement to the subsidiary magazine which has been brought into position directly over the shuttle box, I preferably provide the following means. Suitably supported upon the frame of the master magazine, as indicated most clearly in Figs. 6 and 7, I mount for rocking movement a rock shaft 101 on which is keyed or splined to rock therewith, but in such manner as to slide thereon, a so-called flap 102 having at its upper portion a roll 103 adapted periodically to be brought within the path of rotation of the cam 16, as indicated in Figs. 11, 12 and 13. When the roll 103 is brought within the range of movement of the cam 16, it is held in relation with respect thereto by the guiding rim 17 on the latter and in the continued rotation of said cam in a contraclockwise direction, as indicated in Figs. 12 and 13, the said roll and consequently the flap 102 are downwardly moved from the position indicated in Fig. 12 to that indicated in Fig. 13, thereby to effect replenishment.

Each of the castings or body portions of the subsidiary magazines is provided with a shoulder 104, which when the flap 102 has been brought into position to be depressed by the cam 16, is engaged by a projection 105 of said flap, as indicated in Fig. 11, whereby the subsidiary magazine, which at this time is directly positioned over the shuttle box, is moved radially outward, and in the disclosed embodiment of the invention, is moved downward, as indicated in Figs. 11 and 13, so that one of the bobbin carriers of such subsidiary magazine is moved directly into the shuttle box 106 and the shuttle therein, thus discharging the exhausted or substantially exhausted bobbin or weft carrier 107 from said shuttle, and positioning the replenishing bobbin or weft carrier therein.

As the active or replenishing subsidiary magazine is being moved downward toward the shuttle box 106, the four weft carriers thereon occupy somewhat diagonal or inclined positions as indicated in Fig. 12, but before the proper weft carrier enters the shuttle, it should be brought into a position wherein the arms of the said subsidiary magazine occupy horizontal and vertical positions as indicated in Fig. 13. While for this purpose any suitable means may be employed, I preferably provide a stationary plunger rod 108 mounted in suitable brackets 109 upon the lay of the loom and suitably spaced therefrom, so that when the lay is in the position indicated in Fig. 13, said plunger rod clears all the weft carriers. When the subsidiary magazine in its downward motion toward the shuttle reaches the position represented in Fig. 12, the weft carrier $a$ thereof contacts with the upper end of the plunger rod 108 whereby the subsidiary magazine is swung into the position indicated in Fig. 13, and the weft carrier $d$ thereupon enters the shuttle. Preferably I provide a bumper or protecting device to guard the edge or wall of the shuttle along or adjacent to which the entering weft carrier passes. For this purpose, I have in Figs. 4, 12 and 13, represented a sliding strip 110 mounted upon the horizontal upper face of a bracket 111 itself supported upon the lay of the loom. Said strip is suitably guided at 112, 113 and is normally drawn inward by a coil spring 114 attached to said strip and to the bracket 111. The construction is such that said strip may yield outwardly if engaged by the entering weft carrier.

In the disclosed embodiment of my invention, I effect weft replenishment upon exhaustion or breakage of the filling, and for this purpose may provide any suitable mechanism. Preferably, however, I employ substantially the following means: In Fig. 8, I have represented the usual weft hammer of the loom at 115 having at its upper end a head 116 adapted to engage the hooked end 117 of the usual weft fork 118 when the same is not tilted owing to the absence of filling consequent upon exhaustion or breakage thereof. The said weft fork 117 is pivoted at 119 upon the weft fork slide 120, which at its inner end is bifurcated to receive the weft fork and to permit the tilting movement thereof. The weft fork slide 120 is mounted for sliding movement in a casing 121 having upstanding guiding walls 122, 123 within which said weft fork slide is received. To the walls 122, 123 of said casing 121 are attached screws 124 receiving the ends of coil springs 125, 126, the opposite ends of which are attached to screws 127 upon the weft fork slide 120 and passing through slots 128 in the said walls 122, 123, thus limiting the inward movement of said weft fork slide under the influence of said coil springs 125, 126.

While I may provide any suitable means to rock the shaft 101 that supports the flap 102, I preferably mount upon the upper face of the weft fork slide 120 a spring strip 129 shown most clearly in Fig. 7 and which has an angular extension 130 adapted to be moved with said weft fork slide beneath an arm 131 fast upon and laterally extending from said rock shaft 101. Said extension 130 is preferably of spring metal and is under compression in the position shown in Figs. 7 and 8 beneath said arm 131, so that when it is moved outwardly from beneath said arm it springs up into the plane thereof, as indicated in dotted lines in Fig. 8, and upon the next inward movement of the weft fork slide, the said extension engages said arm and rocks the shaft 101 so as to bring the flap thereof into the path of and beneath the cam 16. Thereupon in the continued rotation of said cam the flap is depressed and replenishment occurs as has been already described.

Upon the flap 102, as shown most clearly in Fig. 7, is a lug 132 which upon the return upward movement of said flap, owing to the tension of the coiled spring 133, shown most clearly in Fig. 6, engages a stud 134 upon the arm 135 of a lever pivoted at 136 upon a suitable bracket. The other arm 137 of said lever is forked and provided with pins 138 adapted to enter a peripheral groove 139 in the outer end of the shaft 28, thereby to impart axial movement to said shaft and to withdraw the pin 97 into the position shown out of the plane of movement of the star wheel 36 and again to position the head 95 of said shaft in the next recess 93 of a tooth 92 of the said star wheel. On the flap 102 is a second lug 140 which in the downward movement of the flap under the agency of the cam 16 depresses the lever arm 135 and imparts axial movement to the shaft 28 in the opposite direction, thereby again to bring the pin 97 into operative engagement with the star wheel and thus to effect the rotation thereof through a single step, as has been already described.

Preferably I provide means adapted to overlie the tip or forward portion of the weft carrier that has been positioned in the shuttle, so as to aid in effecting the proper positioning thereof in the shuttle. For this purpose, I preferably provide the following mechanism:

Upon the cam-shaft 7, as shown most clearly in Fig. 2, is mounted a cam 141 which in the disclosed embodiment of the invention is but slightly eccentric. Suitably pivoted upon the framing of the loom at 142 is a lever 143 having a projection 144 adapted to rest upon the cam 141 so that at every other beat of the lay said lever 143 is lifted. The opposite end of said lever 143 is yieldingly connected to the framing by a coiled spring 145. Pivoted to said lever near the outer end thereof is a link 146, the lower end whereof is pivoted at 147 to the plunger rod 108, the lower end of which is guided in a bracket 149 carried by one of the lay swords 2, so that said plunger partakes of the swinging movement of the lay. Thus upon each alternate beat of the lay the plunger 108 is elevated. At its upper end the said plunger 108, as shown most clearly in Figs. 3 and 9, is provided with a beveled head 150. Near its upper end the said plunger 108 is guided in the bracket 109 having an upwardly extending portion 152 having a guide 153 for the reception of a slide rod 154 also guided at 155 in a bracket 156 upon the side of the lay. The said slide rod 154 is provided with a beveled end 157 adapted to be impinged upon by the beveled head 150 of the plunger rod 108, so that in the upward movement of said plunger rod the slide rod 154 is moved toward the right, viewing Figs. 3 and 9. The said slide rod 154 is normally moved toward the left viewing said figures by a coiled spring 158 held between the bearing 155 for said slide rod and a collar 159 fast upon said rod.

The shipper lever of the loom is indicated at 160 as positioned in the notch of a slot 161 in a suitable bracket 162 having mounted upon its outer end a casing 163 having a top plate 164 and receiving a sliding weft carrier tip holder 165, the inner end whereof is adapted to be projected from the position shown in Fig. 9, so as wholly to overlie the tip portion of the bobbin or weft carrier. The said holder 165 is normally moved forward through the agency of a coiled spring 166 attached to the top plate of said casing and to said holder by screws 167, 168. The top plate of said casing 163 is provided with a slot 169 permitting said sliding movement. Near its outer end the said holder 165 is provided with a notch 170 adapted to be engaged by the outer end 171 of a lever 172 whereby said holder is held in its retracted position as indicated in Fig. 9. The said lever 172, as indicated most clearly in Figs. 5 and 9, is pivoted at 173 upon a bracket 174 rising from the breast beam of the loom and is provided with an end 175 adapted to overlie the shuttle box where replenishment is to occur so as to be depressed by the subsidiary magazine in its downward movement, thus lifting the opposite end 171 of said lever out of said notch 170 of the holder 165 and permitting said holder to be moved inwardly under the tension of the spring 166 immediately upon replenishment and thereby to retain the inserted bobbin or weft carrier in level position in the shuttle, and to assist in causing it to assume such positions.

I provide a suitable resetting device for the sliding holder 165 so that after replenishment has been effected and the weft carrier is properly positioned in the shuttle, the said holder may be again positioned, as shown in Fig. 9, with the end 171 of the lever 172 in the notch 170. For that purpose, I preferably fixedly position upon the sliding rod 154 a suitable collar 176, which upon the downward movement of the plunger rod 108 is moved under the agency of the coil spring 158 into position in line with a shoulder 177 upon the under side of said sliding holder 165 whereby upon the next beat-up of the lay said collar 176 engages said shoulder 177 as indicated in Fig. 10 and moves said sliding shoulder outwardly so as to effect the resetting thereof. The said flap 102 is provided with a downwardly extending lug 178, shown most clearly in Figs. 6, 12 and 13, and adapted in the depressed position of said flap to engage the angular extension 130 and to depress the same so that it may slide under the arm 131 of the rock shaft 101 in the next movement of the weft fork slide 120 toward the left viewing Fig. 8. Upon the frame of the loom I position a suitable stop 179 shown most clearly in Figs. 6 and 9 to engage the projecting arm 131 of the rock shaft 101 and thereby to limit the swinging movement of said rock shaft under the agency of the coil spring 133. I preferably provide a suitable shuttle binder 180 shown most clearly in Fig. 9 and having preferably some suitable lining 181.

In Fig. 14, I have indicated a slightly modified form of one portion of my invention. In the preferred embodiment of the invention I have represented a single thread ring 30 for all the threads of the weft carriers of the magazine. In Fig. 14, I have represented the shaft 52 of a representative one of the subsidiary magazines as provided with an extension or cap 182 mounted upon the threaded end 183 of said shaft 52, and grooved as indicated at 184 for the reception of the thread ends of the several weft carriers pertaining to a single subsidiary magazine.

It will be evident from the foregoing description that upon failure or breakage of the filling the weft fork slide is operated, being moved toward the right in Fig. 8, and that upon the return movement of said slide toward the left in said figure under the agency of the springs 125, 126, the upright shaft 101 is rocked so as to bring the flap 102 and its roller 103 in the path of movement of the cam 16. Upon continued rotation of said cam the subsidiary magazine which has been already positioned directly over the shuttle box wherein replenishment is to occur, is moved downwardly into the position shown in Fig. 13, thereby placing a weft carrier or bobbin of the proper color in the said shuttle box 106, ejecting the exhausted filling carrier therefrom. Upon further rotation of the cam 16 from the position shown in Fig. 13, the flap 102 is lifted by the coiled spring 133, thus withdrawing the subsidiary magazine from the shuttle and leaving the replenishing bobbin or weft carrier in said shuttle. The upward movement of the flap 102 moves the shaft 128 toward the left viewing Fig. 7, thereby withdrawing the actuating pin 97 from the star wheel 36 and bringing the head 95 of said shaft into locking or holding relation with said star wheel as previously described. Upon the next downward movement of the said flap the shaft 128 is moved toward the right viewing Fig. 7 and a partial rotation of the star wheel 36 is effected, so as to bring another subsidiary magazine directly above the running shuttle in the box. When the subsidiary magazine from which replenishment has occurred is moved upward along its arm or spoke under the agency of its spring 44, it is received upon the inwardly curved portion 62 of the guiding rim 57 of the disk 9 and travels thereon in a contra-clockwise direction, as indicated in Fig. 5. Whenever a change is made in the shifting shuttle box so as to bring another shuttle onto the race plate of the lay, the next active subsidiary magazine is partially rotated in the manner already described by the rack 66 so as to position a weft carrier or bobbin of the proper color directly over or substantially directly over the shuttle box wherein replenishment occurs. The position of the weft carrier which is next to replenish the loom is nearest to the shuttle box when the loom is on the back center, or in the extreme backward position farthest away from the weaver. As replenishment occurs the tip holder 165 is released by the lever 172 so that said tip holder engages the upper face of the tip end of the replenishing bobbin or weft carrier and insures the proper position thereof in the shuttle.

Having thus described one illustrative embodiment of my invention, I desire it to be understood that although specific terms are employed, they are used in a generic and descriptive sense and not for purposes of limitation, the scope of the invention being set forth in the following claims.

Claims—

1. In a loom, a lay, shifting means for a series of shuttle boxes, a hopper having a plurality of magazines, means to lower one of said magazines directly into said shuttle, and means controlled by said shifting shuttle box means to cause the presentation of a filling carrier of such magazine, corresponding to that in the running shuttle.

2. In a loom, a movable hopper having a series of magazines relatively movable in operation to effect a change of filling, means to move said hopper, shifting means for a series of shuttle boxes, and means controlled thereby to cause the presentation of a filling carrier of such magazine, corresponding to the filling carrier in the running shuttle.

3. In an automatic loom, a hopper containing a plurality of magazines, means to move said magazines separately from and conjointly with said hopper to cause a change of filling carriers, shifting means for a series of shuttle boxes, and means controlled thereby to cause the presentation of a filling carrier corresponding to that in the running shuttle.

4. In a loom, a lay, a magazine adjacent thereto and adapted to hold a series of filling carriers by the butts and tips and constructed and arranged to be moved positively into actual contact with the shuttle, to cause a filling carrier to be changed therefrom into said shuttle, shifting means for a series of shuttle boxes, and means controlled thereby to cause the presentation for replenishment of a filling carrier corresponding to that in the running shuttle.

5. In a loom, a lay, a magazine adjacent thereto and arranged to hold a series of filling carriers by the butts and tips and constructed and arranged to be positively lowered into actual contact with the shuttle, to cause a filling carrier to be changed therefrom into the shuttle, shifting means for a series of shuttle boxes and means controlled thereby to cause the presentation for replenishment of a filling carrier corresponding to that in the running shuttle.

6. In a loom, a lay, a movable hopper containing a series of magazines, means to move said hopper, means to move said magazines with respect to said hopper for a change of filling, shifting means for a series of shuttle boxes, means controlled thereby to cause the presentation for replenishment of a filling carrier corresponding to that in the running shuttle, and means to return said magazines to their normal position in said hopper.

7. In a loom, a lay, a hopper containing a series of magazines, means to move said magazines radially thereof for a change of filling, shifting means for a series of shuttle boxes, means controlled thereby to cause the presentation of a filling carrier corresponding to that in the running shuttle, and means to return said magazines to their normal position in the hopper.

8. In a loom, a lay, a hopper, a series of magazines contained thereby, and having means separately to support a plurality of filling carriers, means to move said magazines bodily with respect to said hopper toward the shuttle upon the lay, shifting means for a series of shuttle boxes, means controlled thereby to cause the presentation of a filling carrier corresponding to that in the running shuttle, and means to return said magazines to their normal position in said hopper.

9. In a loom, a lay, shifting shuttle boxes adjacent said lay, a plurality of magazines, also adjacent said lay, and having means separately to support a plurality of filling carriers for presentation in replenishing means to hold in operation, one at a time, each of said magazines, combined with means to hold normally at rest, in inoperative position, all other of said plurality of magazines.

10. A loom having a lay, a hopper, a series of magazines contained thereby, and mounted for turning movement, means to move said magazines bodily toward the shuttle upon the lay for a chance of filling, shifting means for a series of shuttle boxes, means controlled thereby to cause the presentation of a filling carrier corresponding to that in the running shuttle, means to return said magazines to their normal position in the hopper, and means to turn said magazines in a direction to bring another filling carrier of any desired color into operative position.

11. In a loom, a lay, a hopper mounted adjacent to said lay and having a series of revoluble magazines adapted to carry a series of filling carriers arranged in non-concentric circles, shifting means for a series of shuttle boxes, and means controlled by said shifting means to cause the presentation of a filling carrier corresponding to that in the running shuttle.

12. In a loom, a lay, a rotary hopper mounted adjacent to said lay, means to rotate said hopper, the latter having a series of revoluble magazines adapted to carry a series of filling carriers arranged in non-concentric circles, shifting means for a series of shuttle boxes, and means controlled thereby to cause the presentation of a filling carrier corresponding to that in the running shuttle.

13. In a loom, a lay, a rotary hopper mounted adjacent to said lay, a series of revoluble magazines carried by said hopper and movable in and out with respect thereto and adapted together to carry a series of filling carriers arranged in non-concentric circles, shifting means for a series of shuttle boxes, and means controlled thereby to cause the presentation of a filling carrier corresponding to that in the running shuttle.

14. In a loom, a lay, a rotary hopper mounted adjacent to said lay, a series of revoluble magazines carried by said hopper and radially movable with respect thereto, said magazines being constructed and arranged to carry a series of filling carriers arranged in nonconcentric circles, shifting means for a series of shuttle boxes and means controlled thereby to cause the presentation of a filling carrier corresponding to that in the running shuttle.

15. In a loom, a lay, a rotary hopper adjacent said lay, a plurality of magazines carried by said hopper, and mounted for turning movement with respect thereto, means positively to control said magazines and to turn them in large and small circular paths, shifting means for a series of shuttle boxes and means controlled thereby to cause the presentation for replenishment of a filling carrier corresponding to that in the running shuttle.

16. In a loom, a lay, a master magazine adjacent said lay, means to actuate said magazine intermittently, a series of smaller magazines carried thereby, means to rotate said smaller magazines into selected segmental positions, shifting means for a series of shuttle boxes and means controlled thereby to cause the presentation for replenishment of a filling carrier corresponding to that in the running shuttle.

17. In a loom, a lay, a rotary magazine adapted to contain a series of filling carriers held by their butts and tips, means to cause a filling carrier to move forward with the lay and to effect a change of filling carriers directly by the movement of said magazine, shifting means for a series of shuttle boxes, and means controlled thereby to cause the presentation for replenishment of a filling carrier corresponding to that in the running shuttle.

18. In a loom, a lay, a master magazine, a plurality of subsidiary magazines rotatably carried by said master magazine and adapted to contain a series of filling carriers, means to cause the filling carriers to move forward with the lay and to effect a change of filling carriers, shifting means for a series of shuttle boxes, and means controlled thereby to cause the presentation for replenishment of a filling carrier corresponding to that in the running shuttle.

19. In a loom, a lay, a master magazine, a series of subsidiary magazines carried by said master magazine, and radially movable with respect thereto, means to cause a filling carrier to move forward with the lay and to effect in co-action with said radial movement a change of filling carriers, shifting means for a series of shuttle boxes, and means controlled thereby to cause the presentation of a filling carrier corresponding to that in the running shuttle.

20. In a loom, a lay, a rotary master magazine mounted adjacent to said lay and having a series of positively operative subsidiary magazines, means to cause filling carriers supported by said subsidiary magazines to be brought into a changing position, shifting means for a series of shuttle boxes and means controlled thereby to cause the presentation for replenishment of a filling carrier corresponding to that in the running shuttle.

21. In a loom, a lay, a master magazine mounted adjacent thereto and having a series of positively operative subsidiary magazines, means to cause a filling carrier supported by one of said subsidiary magazines to be moved into the shuttle while supported by said subsidiary magazine, shifting means for a series of shuttle boxes, and means controlled thereby to cause the presenation for replenishment of a filling carrier corresponding to that in the running shuttle.

22. In a loom, a lay, a master magazine, a series of secondary magazines carried thereby, and having bodily and also turning movement, a flexible power transmitter connecting a going part of said loom with said master magazine, shifting means for a series of shuttle boxes, and means controlled thereby to cause the presentation for replenishment of a filling carrier corresponding to that in the running shuttle.

23. In a loom, a lay, an adjacent magazine provided with a radial arm, a smaller magazine slidably mounted on said arm, shifting means for a series of shuttle boxes, means controlled thereby to cause the presentation for replenishment of a filling carrier corresponding to that in a running shuttle, and means to cause said smaller magazine to descend toward said lay to cause a change of filling carriers.

24. In a loom, a lay, an adjacent rotary magazine provided with a spoke, a smaller magazine slidably mounted on said spoke, means to cause said smaller magazine to move along said spoke toward the lay to cause a change of filling carriers, shifting means for a series of shuttle boxes, and means controlled thereby to cause the presentation of a filling carrier corresponding to that in the running shuttle.

25. In a loom, a lay, an adjacent rotary magazine provided with a radial arm, a smaller magazine slidably mounted on said radial arm and also rotatable upon its axis, shifting means for a series of shuttle boxes, means controlled thereby to rotate said smaller magazine, thereby to cause the presentation for replenishment of a filling carrier corresponding to that in the running shuttle, and means to cause said smaller magazine to move along said radial arm toward said lay to cause a change of filling carriers.

26. In a loom, a magazine having a series of radial members, a series of subsidiary magazines, means to move said subsidiary magazines radially, shifting means for a series of shuttle boxes, and means controlled by said shifting means to impart rotative movement to said subsidiary magazines.

27. In a loom, a lay, a rotatable master magazine, a stand whereon said magazine is supported adjacent said lay, a series of smaller magazines under the control of said master magazine, means to impart radial and rotary motions to said smaller magazines, a checking device to restrain said master magazine from undue rotation, shifting means for a series of shuttle boxes, and means controlled by said shifting means to control the rotary motions of said smaller magazines.

28. In a loom, a rotary master magazine, a rotary subsidiary magazine carried thereby, said rotary master magazine having a device to restrain said subsidiary magazine from rotation in either direction, shifting means for a series of shuttle boxes, and means controlled by said shifting means to cause the rotation of said subsidiary magazine to effect the presentation for replenishment of a filling carrier corresponding to that in the running shuttle.

29. In a loom, a magazine, a member whereon the same is mounted, a cam to depress said magazine, means to raise said magazine into its normal stationary position, shifting means for a series of shuttle boxes, and means controlled thereby to cause the presentation for replenishment of a filling carrier of said magazine, corresponding to that in the running shuttle.

30. In a loom, a master magazine having a radial member, a subsidiary magazine mounted thereon, a cam to depress said magazine along said member, means to raise said magazine into its normal stationary position, shifting means for a series of shuttle boxes, and means controlled by said shifting means to impart turning movement to said subsidiary magazine, thereby to effect the presentation of a filling carrier of said subsidiary magazine corresponding to that in the running shuttle.

31. In a loom, a master magazine having a radial member, a subsidiary magazine mounted upon said member, a rotatable cam to move said subsidiary magazine outward along said radial member, shifting means for a series of shuttle boxes, means controlled thereby to cause the presentation for replenishment of a filling carrier of said subsidiary magazine, corresponding to that in the running shuttle, and means to return said subsidiary magazine into its normal stationary position.

32. In a loom, a master magazine having a radial member, a subsidiary magazine mounted upon said rotary member, a cam to move said magazine outwardly along said radial member, shifting means for a series of shuttle boxes, means controlled thereby to cause the presentation for replenishment of a filling carrier of said subsidiary magazine corresponding to that in the running shuttle, and means to return said subsidiary magazine into its normal stationary position.

33. In a loom, a rotatable master magazine having a radial member, a rotatable, subsidiary magazine mounted upon said radial member and movable therealong, a cam to move said subsidiary magazine in one direction along said radial member, shifting means for a series of shuttle boxes, means controlled thereby to cause the presentation for replenishment of a filling carrier corresponding to that in the running shuttle, and means to move the subsidiary magazine in the opposite direction.

34. In a loom, a master magazine having a series of subsidiary, rotatable magazines, means to move one of said series of magazines out of its normal position toward its filling changing position, shifting means for a series of shuttle boxes, and means controlled by said shifting means to rotate said magazine into a filling changing position.

35. In a loom, a lay, a master magazine adjacent said lay and having a plurality of subsidiary rotatable magazines, each subsidiary magazine being adapted to carry a plurality of filling carriers, means to actuate said master magazine positively in a circular path to bring one of said subsidiary magazines into an operative position for a change of filling carriers in said shuttle, shifting means for a series of shuttle boxes, and means controlled thereby to effect rotative movement of said active subsidiary magazine.

36. In a loom, a lay, a magazine adapted to support a plurality of weft carriers, shifting means for a series of shuttle boxes, means controlled by said shifting means to cause the presentation of a filling carrier corresponding to that in the running shuttle, a movable tip holder for the replenishing weft carrier and means for resetting said tip holder.

37. In a loom, a lay, a non-gravity-actuated filling-holding device, having means to support a plurality of contrasting filling carriers for presentation in replenishing, means to actuate said filling holding device to permit the same to coact with the shuttle upon the lay, shifting means for a series of shuttle boxes, and means controlled by said shifting means to cause the presentation for replenishment of a filling carrier of said filling holding device corresponding to that in the running shuttle.

38. In a loom, a lay, a bodily movable and rotary magazine adapted to support filling carriers, means to impart both of said motions to said magazine, a shifting means for a series of shuttle boxes, and means controlled by said shifting means to govern the rotary motion of said magazine.

39. In a loom, a lay, a master magazine provided with a subsidiary magazine having positive, downward, radial movement to cause the same to co-act with the shuttle upon the lay, shifting means for a series of shuttle boxes, and means controlled thereby to cause the presentation for replenishment of a filling carrier of said subsidiary magazine corresponding to that in the running shuttle.

40. In a loom, a master magazine having a series of subsidiary rotatable magazines, means to move one of said series of magazines out of its normal position toward its filling changing position, shifting means for a series of shuttle boxes, and means controlled by said shifting shuttle box means to cause rotative movement of the active subsidiary magazine in conformity with the movements of said shifting shuttle box means.

41. In a loom, a master magazine having a series of subsidiary, rotatable magazines, means to move one of said series of magazines out of its normal position toward the filling changing position, shifting means for a series of shuttle boxes, means to restrain said subsidiary magazines from rotation, and means to compel rotative movement thereof in conformity with movements of the shifting shuttle box means.

42. In a loom, a master magazine having a series of subsidiary, rotatable magazines, gears carried by said subsidiary magazines, shifting means for a series of shuttle boxes, and means under the control of said shifting shuttle box means to impart rotative movement to said gears.

43. In a loom, a master magazine having a series of subsidiary, rotatable magazines, gears carried by said subsidiary magazines, shifting means for a series of shuttle boxes, means under the control of said shifting shuttle-box means to impart rotative movement to said gears, and means to move one of said series of magazines out of its normal position toward its filling-changing position.

44. In a loom, a master magazine having a series of subsidiary, rotatable magazines, gears carried by said subsidiary magazines, shifting means for a series of shuttle boxes, and a rack under the control of said shifting shuttle-box means to impart rotative movement to said gears.

45. In a loom, a master magazine having a series of subsidiary, rotatable magazines, gears carried by said subsidiary magazines, shifting means for a series of shuttle boxes, a rack under the control of said shifting shuttle-box means to impart rotative movement to said gears, and means to move one of said series of magazines out of its normal position toward its filling-changing position.

46. In a loom, a master magazine having a series of subsidiary, rotatable magazines, means to move one of said series of magazines out of its normal position toward the filling-changing position, shifting means for a series of shuttle boxes, and means controlled thereby to cause rotative movement of said subsidiary magazine in accordance with changes in the position of said shifting shuttle box means.

47. In a loom, a master magazine having a series of subsidiary, rotatable magazines, shifting means for a series of shuttle boxes, means controlled thereby to cause rotative movement of said subsidiary magazines, and means to vary the position of said rotative-movement-causing means.

48. In a loom, a master magazine having a series of subsidiary magazines, gears carried by said subsidiary magazines, a rack adapted to mesh with said gear, and means to vary the position of said rack.

49. In a loom, a master magazine having a series of subsidiary, rotatable magazines, gears carried thereby, shifting means for a series of shuttle boxes, a rack adapted to mesh with said gear, and means governed by said shifting shuttle box means to vary the position of said rack in accordance with changes of the shifting shuttle box means.

50. In a loom, a lay, shifting shuttle boxes adjacent one end of said lay, a set of magazines adjacent the opposite end of said lay, a master device controlling said magazines, said device having means to bring into operative position each of said magazines and to cause the same to take a fixed inoperative position, while causing another of said magazines simultaneously to take a rotative position according to the position of said shifting shuttle boxes.

51. In a loom, a lay, shifting shuttle boxes adjacent said lay, means to control the movement of said shifting shuttle boxes, a plurality of magazines, a shifting device also under control of said means and arranged to keep one of said plurality of magazines in unison with said shifting shuttle boxes, combined with means to change two of said plurality of magazines from their operative to their inoperative and from their inoperative to their operative positions to thereby keep in reserve a full magazine.

52. In a loom, a lay, shifting means for a series of shuttle boxes, a hopper having a plurality of magazines, means to move one of said magazines directly into said shuttle, and means controlled by said shifting shuttle-box means to cause the presentation of a filling carrier of such magazine, corresponding to that in the running shuttle.

53. In a loom, a lay, shifting means for a series of shuttle boxes, a hopper having a plurality of magazines, means relatively to move a shuttle in one of said boxes and one of said magazines, thereby to position said magazine directly in said shuttle, and means controlled by said shifting shuttle box means to cause the presentation of a filling carrier of such magazine, corresponding to that in the running shuttle.

54. In a loom, a hopper having a series of separable magazines operative to effect a change of filling, each magazine having means separately to support a plurality of filling carriers, for presentation in replenishing, shifting means for a series of shuttle boxes, and means controlled thereby to cause the presentation of a filling carrier of such separable magazines, corresponding to the filling carrier in the running shuttle.

In testimony whereof, I have signed my name to this specification, in the presence of two subscribing witnesses.

RANDOLPH CROMPTON.

Witnesses:
GRACE M. TALLMAN,
ELIZABETH W. GILBERT.

Copies of this patent may be obtained for five cents each, by addressing the "Commissioner of Patents, Washington, D. C."

R. W. DAVENPORT.
ELECTRICALLY HEATED OVEN.
APPLICATION FILED OCT. 10, 1914.
1,142,939.
Patented June 15, 1915.
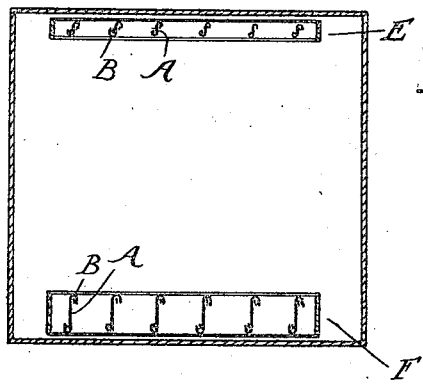
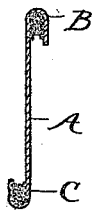
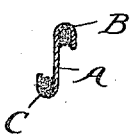
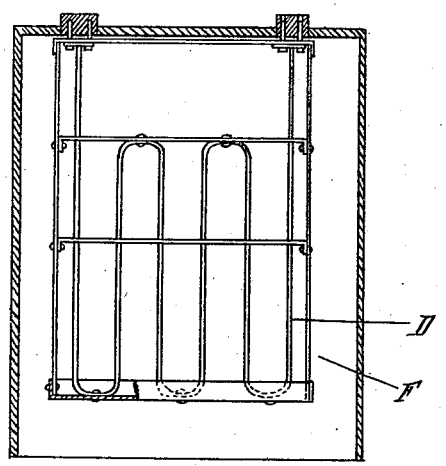
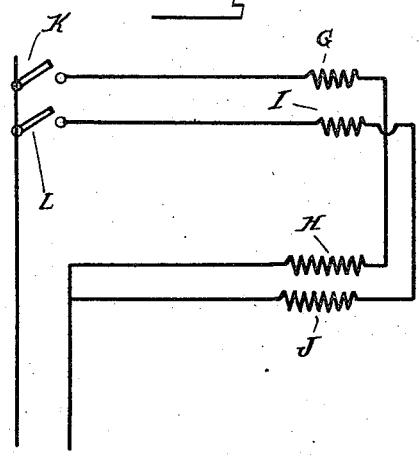
WITNESSES:
INVENTOR
Ransom W. Davenport
BY
Whittemore Hulbert & Whittemore
ATTORNEYS